United States Patent
Hollmach et al.

(10) Patent No.: US 11,598,657 B2
(45) Date of Patent: Mar. 7, 2023

(54) MEASUREMENT SYSTEM FOR MEASURING A FLOW PARAMETER OF A FLUID FLOWING IN A PIPE

(71) Applicant: Endress+Hauser Flowtec AG, Reinach (CH)

(72) Inventors: Marc Hollmach, Basel (CH); Michel Wagner, Birsfelden (CH); Rainer Höcker, Waldshut (DE)

(73) Assignee: Endress+Hauser Flowtec AG, Reinach (CH)

( * ) Notice: Subject to any disclaimer, the term of this patent is extended or adjusted under 35 U.S.C. 154(b) by 144 days.

(21) Appl. No.: 17/413,890

(22) PCT Filed: Nov. 13, 2019

(86) PCT No.: PCT/EP2019/081208
§ 371 (c)(1),
(2) Date: Jun. 14, 2021

(87) PCT Pub. No.: WO2020/120060
PCT Pub. Date: Jun. 18, 2020

(65) Prior Publication Data
US 2022/0057240 A1    Feb. 24, 2022

(30) Foreign Application Priority Data

Dec. 14, 2018 (DE) .................... 10 2018 132 311.5

(51) Int. Cl.
*G01F 1/32* (2022.01)
*G01F 1/325* (2022.01)
(52) U.S. Cl.
CPC .......... *G01F 1/3209* (2013.01); *G01F 1/3266* (2022.01)

(58) Field of Classification Search
CPC ........ G01F 1/32; G01F 1/3209; G01F 1/3218; G01F 1/3266
See application file for complete search history.

(56) References Cited

U.S. PATENT DOCUMENTS 5,869,772 A   2/1999 Storer
6,003,384 A   12/1999 Fröhlich et al.
(Continued)

FOREIGN PATENT DOCUMENTS

CN    101226070 A    6/2010
DE      3836488 A1   5/1989
(Continued)

OTHER PUBLICATIONS

Kuromori, JP 05-079870, Mar. 1993, WIPO Machine Translation (Year: 1993).*

*Primary Examiner* — Erika J. Villaluna
(74) *Attorney, Agent, or Firm* — Christopher R. Powers; Endress+Hauser (USA) Holding, Inc.

(57) ABSTRACT

A measurement system includes: a tube; a bluff body, situated in the lumen of the tube, for generating vortices in a flowing fluid such that a Karman vortex street is formed downstream of the bluff body; a vortex sensor, having a mechanical resonant frequency, for providing a vortex sensor signal which changes over time and contains a first component representing the vortex shedding frequency and which contains a second component representing the mechanical resonant frequency of the vortex sensor; and transducer electronics for evaluating the at least one vortex sensor signal and configured to do the following: to determine vortex frequency measurement values representing the shedding frequency using the first component and, if the first component is not present, not to provide flow parameter measurement values and to generate a message indicating (Continued)

the current flow speed is not lower than the current acoustic velocity of the flowing fluid.

24 Claims, 4 Drawing Sheets

(56) References Cited

U.S. PATENT DOCUMENTS

| | | |
|---|---|---|
| 6,101,885 A | 8/2000 | Touzin et al. |
| 6,352,000 B1 | 3/2002 | Getman et al. |
| 6,910,387 B2 | 6/2005 | Koudal et al. |
| 6,938,496 B2 | 9/2005 | Koudal et al. |
| 8,010,312 B2 | 8/2011 | Höcker |
| 8,200,450 B2 | 6/2012 | Höcker |
| 8,370,098 B2 | 2/2013 | Höcker |
| 8,447,536 B2 | 5/2013 | Höcker |
| 2005/0230973 A1 | 10/2005 | Fripp et al. |
| 2006/0230841 A1 | 10/2006 | Shrikrishna |
| 2008/0072686 A1 | 3/2008 | Höcker |
| 2011/0154913 A1 | 6/2011 | Konyukhov et al. |
| 2011/0247430 A1 | 10/2011 | Hertel et al. |
| 2017/0284841 A1 | 10/2017 | Lais et al. |

FOREIGN PATENT DOCUMENTS

| | | |
|---|---|---|
| DE | 102009001526 A1 | 9/2010 |
| DE | 102014112558 A1 | 3/2016 |
| EP | 0666467 A2 | 8/1995 |
| EP | 2486375 B1 | 7/2016 |
| JP | 1113617 A | 5/1989 |
| JP | 579870 A | 3/1993 |
| WO | 9843051 A2 | 10/1998 |
| WO | 2017153124 A1 | 9/2017 |

* cited by examiner

MEASUREMENT SYSTEM FOR MEASURING A FLOW PARAMETER OF A FLUID FLOWING IN A PIPE

CROSS-REFERENCE TO RELATED APPLICATIONS

The present application is related to and claims the priority benefit of German Patent Application No. 10 2018 132 311.5, filed on Dec. 14, 2018, and International Patent Application No. PCT/EP2019/081208, filed on Nov. 13, 2019, the entire contents of which are incorporated herein by reference.

TECHNICAL FIELD

The invention relates to a measurement system for measuring at least one flow parameter of a fluid flowing in a pipe.

BACKGROUND

In process measurement and automation technology, measurement systems designed as vortex flow meters are often used for the measurement of flow velocities of fluids flowing in pipes, especially fast-flowing and/or hot gases and/or fluid flows of high Reynolds number, or of flow parameters corresponding to a respective flow speed, such as volume flow rates or mass flow rates or totaled volume flows or mass flows. Examples of such measurement systems are known, inter alia, from EP-A 666 467, US-A 2006/0230841, US-A 2008/0072686, US-A 2011/0154913, US-A 2011/0247430, US-A 2017/0284841, U.S. Pat. Nos. 6,003,384, 6,101,885, 6,352,000, 6,910,387, 6,938,496, 8,010,312, 8,200,450, 8,370,098, 8,447,536, WO-A 98/43051 or WO-A 2017/153124 and are also offered, inter alia, by the applicant, for example under the trade name "PROWIRL D 200", "PROWIRL F 200", "PROWIRL O 200", "PROWIRL R 200".

Each of the measurement systems shown has a bluff body, which protrudes into the lumen of the respective pipe, for example specifically designed as a system component of a heat supply network or of a turbine circuit or into a lumen of a measurement tube used in the course of said pipe, against which bluff body fluid, for example a (hot) steam, flows to generate vortices that are lined up to form a so-called Kármán vortex street within the partial volume of the fluid flow flowing directly downstream of the bluff body. As is known, the vortices are generated at the bluff body at a shedding frequency ($f_V$) that depends on the flow speed of the fluid flowing through the measurement tube in a main flow direction and, with the Strouhal number ($Sr \sim f_V/u$) as a proportionality factor, is proportional to the flow speed (u) of the fluid flowing past the bluff body, at least for high Reynolds numbers (Re) of more than 20,000. Furthermore, the measurement systems have a vortex sensor protruding into the flow and therefore into lumens of the region of the Kármán vortex street, for example positioned downstream of the bluff body or integrated therein. Said vortex sensor is used especially to sense pressure fluctuations in the Kármán vortex street formed in the flowing fluid and to convert them into a vortex sensor signal, for example an electrical or optical vortex sensor signal, which represents the pressure fluctuations and corresponds to a pressure prevailing within the fluid and subject to periodic fluctuations downstream of the, typically prismatic or cylindrical bluff body as a result of vortices in the opposite direction, such that the vortex sensor signal contains a useful component, specifically a spectral signal component having an amplitude that represents the shedding frequency and at the same time differs significantly from the signal noise.

In the case of the measurement system disclosed in each of U.S. Pat. No. 6,352,000, US-A 2006/0230841 or US-A 2017/0284841, the vortex sensor has a sensor assembly formed by means of a deformation element, usually in the form of a thin and substantially flat diaphragm, and a, usually planar or wedge-shaped, sensor lug that extends from a substantially planar surface of said deformation element, said sensor assembly being configured to sense pressure fluctuations effective in a detection direction transversely to the actual main flow direction in the Kármán vortex street, namely to convert them into movements of the deformation element corresponding to the pressure fluctuations such that the sensor lug, as a result of the pressure fluctuations, executes pendular movements in the detection direction that elastically deform the deformation element, as a result of which the deformation element and the sensor lug are excited into forced, but non-resonant, oscillations, typically specifically below a lowest mechanical resonant frequency of the vortex sensor, around a common static rest position. The deformation element further has an outer edge segment, usually circular-ring-shaped, which is configured to be hermetically sealed, for example integrally bonded, to a socket that is used to hold the deformation element and the sensor formed therewith on the wall of a tube such that the deformation element covers and hermetically seals an opening provided in the wall of the tube and that the surface of the deformation element supporting the sensor lug faces the fluid-carrying lumen of the measurement tube or the pipe, and therefore the sensor lug projects into said lumen. In order to generate the vortex sensor signal, the vortex sensor further comprises a corresponding transducer element, which is for example formed specifically by means of a capacitor mechanically coupled to the sensor assembly or integrated therein or by means of a piezoelectric stack acting as a piezoelectric transducer and is configured to detect movements of the deformation element, not least also movements of the deformation element corresponding to pressure fluctuations, or of the compensating element that may be present, and to modulate them to form an electrical or optical carrier signal. As shown, inter alia, in U.S. Pat. No. 6,352,000 or US-A 2017/0284841, the sensor assemblies or the vortex sensor formed therewith can also have a usually rod-shaped, planar or sleeve-shaped compensating element that extends from a surface of the deformation element facing away from the surface supporting the sensor lug and is used especially to compensate for forces or moments resulting from movements of the sensor assembly, for example as a result of vibrations of the pipe, or to avoid undesired movements of the sensor lug resulting therefrom.

On a side facing away from the fluid-carrying lumen, the vortex sensor is furthermore connected to transducer electronics, which are typically encapsulated in a pressure-tight and impact-proof manner and optionally also hermetically sealed towards the outside. The transducer electronics have a corresponding digital measurement circuit, which is electrically connected to the vortex sensor or its transducer element via connection lines, optionally with the interposition of electrical barriers and/or galvanic isolation points, for processing or evaluating the vortex sensor signal and for generating digital measurement values for the flow parameter to be detected in each case, for example the flow speed, the volume flow rate and/or the mass flow rate. In particular, the transducer electronics are configured to determine digital vortex frequency measurement values representing the shedding frequency using the at least one vortex sensor signal and to calculate, using one or more vortex frequency measurement values, measurement values for the at least one flow parameter and to output same, for example to a display element provided correspondingly in the measurement system. As is also shown in the aforementioned documents U.S. Pat. Nos. 6,938,496, 6,910,387, 8,010,312, 8,200,450, 8,370,098 or 8,447,536, measurement systems of the type in question can also have a temperature sensor, for example arranged downstream of the bluff body or therein, and/or a pressure sensor, for example arranged downstream of the bluff body or therein, and the transducer electronics can additionally be configured to calculate measurement values for the at least one flow parameter also using a temperature sensor signal provided by the temperature sensor or using a pressure sensor signal provided by the pressure sensor. The transducer electronics, usually accommodated in a protective housing made of metal and/or impact-resistant plastic, of measurement systems suitable for industry or established in industrial measurement technology also usually provide external interfaces conforming to an industry standard, for example DIN IEC 60381-1, for communication with higher-level measurement and/or regulator systems, for example formed by means of programmable-logic controllers (PLC). Such an external interface can be designed, for example, as a two-wire connection that can be incorporated into a current loop and/or be compatible with established industrial field buses.

Investigations on measurement systems of the type in question, which are also used in steam applications, inter alia, have shown that, when used for measuring totaled volume flow rates or mass flow rates, occasionally excessive measurement errors, specifically far beyond a specification of the measurement system in question, can occur. Furthermore, it has been shown that particularly high measurement errors can be recorded, for example during the startup of the plant in question, such that the totaled volume flow rate or mass flow rate measured for this has been estimated to be much too low in comparison with the actual volume flow rate or mass flow rate; this not least because incorrect, especially erroneously zero-estimated, measurement values for the shedding frequency were occasionally ascertained at very high flow speed and used for measuring the totaled volume flow rate or mass flow rate.

SUMMARY

Proceeding from the aforementioned prior art, it is an object of the invention to improve measurement systems of the aforementioned type in such a way that measurement errors at a very high flow speed can be avoided and/or the presence of an excessively high flow speed, specifically a flow speed outside a specified measurement range, can be at least detected.

To achieve the object, the invention consists in a measurement system for measuring at least one flow parameter, for example a time-variable flow parameter, for example a flow speed and/or a volume flow rate and/or a mass flow rate, of a fluid, for example a gas or aerosol, flowing in a pipe, which measurement system comprises:
- a tube that is insertable in the course of said pipe and has a lumen that is configured to guide the fluid flowing in the pipe or for said fluid to flow through it;
- a bluff body, for example a prismatic or cylindrical bluff body, which is arranged in the lumen of the tube and is configured to generate vortices in the fluid flowing past at a shedding frequency dependent on a current flow speed u of said fluid, such that a Kármán vortex street is formed in the fluid flowing downstream of the bluff body;
- a vortex sensor, for example arranged downstream of the bluff body or integrated therein, which has at least one mechanical resonant frequency, which is, for example, lowest and/or always above the shedding frequency, and which is configured to provide at least one vortex sensor signal, for example an electrical or optical vortex sensor signal, which changes over time and contains a first useful component, specifically a first spectral signal component that represents the shedding frequency and, for example, has a signal level not below a predetermined threshold value for signal noise, if a Kármán vortex street is formed in the fluid flowing downstream of the bluff body, and which contains a second useful component, specifically a second spectral signal component that represents the at least one mechanical resonant frequency of the vortex sensor and, for example, has a signal level not below a predetermined threshold value for signal noise, if fluid flows past the vortex sensor;
- and transducer electronics, for example formed by means of at least one microprocessor, for evaluating the at least one vortex sensor signal and for determining measurement values, for example digital measurement values, for the at least one flow parameter;
  - wherein the transducer electronics are configured to receive the at least one vortex sensor signal and determine whether the first useful component and/or the second useful component is present in the at least one vortex sensor signal;
  - wherein the transducer electronics are configured, if the first useful component is present in the at least one vortex sensor signal, to determine vortex frequency measurement values, for example digital vortex frequency measurement values, representing the shedding frequency on the basis of the first useful component of the at least one vortex sensor signal and to provide flow parameter measurement values of the first type, specifically measurement values, for example digital measurement values, calculated using one or more vortex frequency measurement values, for the at least one flow parameter;
  - and wherein the transducer electronics are configured, if the first useful component is not present or is not determined in the at least one vortex sensor signal, but the second useful component is present or is determined in the at least one vortex sensor signal, not to provide any flow parameter measurement values of the first type and/or to generate a control command that prevents output of flow parameter measurement values of the first type and/or to generate, for example specifically to output, a message that indicates that the current flow speed of the fluid flowing past the bluff body is not lower than a current acoustic velocity of said fluid, for example specifically that the current flow speed of the fluid flowing past the bluff body is equal to the current acoustic velocity thereof, therefore corresponding to a Mach number of one.

According to a first embodiment of the invention, the transducer electronics are configured, if the first useful component is present in the at least one vortex sensor signal, to generate a control command prompting output of flow parameter measurement values of the first type.

According to a second embodiment of the invention, the transducer electronics have a first signal filter that is configured to receive the vortex sensor signal at a signal input and to provide at a filter output a first useful signal, for example a digital first useful signal, containing the first useful component of the vortex sensor signal but, for example, containing the second useful component only in attenuated form or not at all.

According to a third embodiment of the invention, the transducer electronics have a second signal filter that is configured to receive the vortex sensor signal at a signal input and to provide at a filter output a second useful signal, for example a digital second useful signal, containing the second useful component of the vortex sensor signal but, for example, containing the first useful component only in attenuated form or not at all. Further forming this embodiment of the invention, the transducer electronics are further configured to determine, using the first useful signal, whether the first useful component is present in the at least one vortex sensor signal and/or to determine, using the second useful signal, whether the second useful component is present in the at least one vortex sensor signal.

According to a fourth embodiment of the invention, the transducer electronics are configured both to generate a discrete Fourier transform (DFT) of the at least one vortex sensor signal and to determine, on the basis of said discrete Fourier transform of the at least one vortex sensor signal, whether the first useful component and/or the second useful component is present in the at least one vortex sensor signal.

According to a fifth embodiment of the invention, the transducer electronics are further configured both to calculate an autocorrelation (AKF) of the at least one vortex sensor signal and to determine, on the basis of said autocorrelation (AKF) of the at least one vortex sensor signal, whether the first useful component and/or the second useful component is present in the at least one vortex sensor signal.

According to a sixth embodiment of the invention, the transducer electronics have at least one converter circuit, which is configured to receive and digitize the at least one vortex sensor signal, for example specifically to convert it into a digital vortex sensor signal and to provide said digital vortex sensor signal at a digital output of the converter circuit.

According to a seventh embodiment of the invention, the transducer electronics are configured to calculate the flow parameter measurement values of the first type also using a Strouhal number, specifically a characteristic number representing a ratio of the shedding frequency to the flow speed of the fluid flowing past the bluff body.

According to an eighth embodiment of the invention, the transducer electronics are configured, if neither the first useful component nor the second useful component is determined in the at least one vortex sensor signal, to generate, for example specifically to output, a message indicating that no fluid is currently flowing through the tube.

According to a ninth embodiment of the invention, the vortex sensor has a deformation element, for example a diaphragm-like and/or disk-shaped deformation element, with a first surface facing the lumen and an opposite second surface, for example arranged at least partially parallel to the first surface, and the vortex sensor has at least one transducer element, which is arranged above and/or on the second surface of the deformation element, for example attached specifically to the deformation element and/or positioned in the vicinity thereof, and is configured to detect movements of the deformation element, for example of the second surface thereof, and convert them into the vortex sensor signal. Further forming this embodiment, it is further provided for the vortex sensor to have a sensor lug, for example a planar or wedge-shaped sensor lug, extending from the first surface of the deformation element to a distal end.

According to a tenth embodiment of the invention, the fluid is gaseous, for example specifically water vapor, natural gas or biogas.

According to a first development of the invention, the measurement system further comprises: a display element coupled to the transducer electronics for outputting measurement values provided by the transducer electronics for the at least one flow parameter and/or messages generated by means of the transducer electronics.

According to a second development of the invention, the measurement system further comprises: a pressure sensor, for example downstream of the bluff body, which is configured to provide at least one pressure sensor signal that follows a change in a pressure, especially a static pressure, of the flowing fluid with a change in at least one signal parameter; wherein the transducer electronics are configured to receive the at least one pressure sensor signal, and wherein the transducer electronics are configured to determine, on the basis of the at least one pressure sensor signal, pressure measurement values representing said pressure of the fluid.

According to a third development of the invention, the measurement system further comprises: a temperature sensor, especially downstream of the bluff body or arranged therein, which is configured to provide at least one temperature sensor signal that follows a change in a temperature of the flowing fluid with a change in at least one signal parameter, wherein the transducer electronics are configured to receive the at least one temperature sensor signal, and wherein the transducer electronics are configured to determine, on the basis of the at least one temperature sensor signal, temperature measurement values representing said temperature of the fluid.

According to a first embodiment of the third development of the invention, the transducer electronics are configured to determine, using both the at least one vortex sensor signal and the at least one temperature sensor signal, an acoustic velocity of the fluid flowing past the bluff body, especially to calculate acoustic velocity measurement values representing said acoustic velocity.

According to a second embodiment of the third development of the invention, the transducer electronics are configured to determine, using the at least one vortex sensor signal, for example using both the at least one vortex sensor signal and the temperature sensor signal, a Mach number for the fluid flowing past the bluff body, especially to calculate Mach number measurement values representing said Mach number. Further forming this embodiment of the invention, the transducer electronics are further configured, if the second useful component is present in the at least one vortex sensor signal but the first useful component is not present or is not determined in the at least one vortex sensor signal, to set the Mach number measurement value to a predetermined fixed value, for example to one, or to output said predetermined fixed value as a Mach number measurement value.

According to a fourth development of the invention, the measurement system further comprises: a temperature sensor, for example downstream of the bluff body or arranged therein, which is configured to provide at least one temperature sensor signal that follows a change in a temperature of the flowing fluid with a change in at least one signal parameter, wherein the transducer electronics are further configured to receive the at least one temperature sensor signal, and wherein the transducer electronics are configured to determine, on the basis of the at least one temperature sensor signal, temperature measurement values representing said temperature of the fluid as flow parameter measurement values of the second type, specifically to provide measurement values for the at least one flow parameter calculated using one or more temperature measurement values, but without using a vortex frequency measurement value.

According to a first embodiment of the fourth development of the invention, the transducer electronics are configured, if the second useful component is present in the at least one vortex sensor signal but the first useful component is not present or is not determined in the at least one vortex sensor signal, to generate a control command prompting output of flow parameter measurement values of the second type.

According to a second embodiment of the fourth development of the invention, the transducer electronics are configured, if the first useful component is present in the at least one vortex sensor signal, to generate a control command that prevents output of flow parameter measurement values of the second type.

According to a third embodiment of the fourth development of the invention, the transducer electronics are configured, if the second useful component is present in the at least one vortex sensor signal but the first useful component is not present or is not determined in the at least one vortex sensor signal, to output flow parameter measurement values of the second type.

According to a fourth embodiment of the fourth development of the invention, the transducer electronics are configured, if the second useful component is present in the at least one vortex sensor signal but the first useful component is not present or is not determined in the at least one vortex sensor signal, to use an equivalence frequency calculated on the basis of the temperature, specifically a frequency corresponding to the acoustic velocity for determining measurement values for the at least one flow parameter.

According to a fifth embodiment of the fourth development of the invention, the transducer electronics are configured, if the first useful component is present in the at least one vortex sensor signal, to output no flow parameter measurement values of the second type.

According to a sixth embodiment of the fourth development of the invention, the transducer electronics are configured to calculate at least the flow parameter measurement values of the second type also using an isentropic exponent, specifically a characteristic number representing a ratio of a heat capacity of the fluid at constant pressure to a heat capacity of the fluid at constant volume.

According to a seventh embodiment of the fourth development of the invention, the transducer electronics are configured to determine, using both the at least one vortex sensor signal and the at least one temperature sensor signal, the acoustic velocity of the fluid flowing past the bluff body, especially to calculate acoustic velocity measurement values representing said acoustic velocity, and the transducer electronics are further configured to calculate, also using one or more acoustic velocity measurement values, at least the flow parameter measurement values of the second type, for example specifically to output said acoustic velocity measurement values as flow parameter measurement values of the second type.

According to an eighth embodiment of the fourth development of the invention, the transducer electronics are configured to determine, using the at least one vortex sensor signal, especially using both the at least one vortex sensor signal and the temperature sensor signal, a Mach number for the fluid flowing past the bluff body, for example to calculate Mach number measurement values representing said Mach number, and the transducer electronics are further configured to calculate, also using one or more Mach number measurement values, for example also using one or more pressure measurement values, at least the flow parameters of the second type.

According to a ninth embodiment of the fourth development of the invention, the transducer electronics are configured, if neither the first useful component nor the second useful component is determined in the at least one vortex sensor signal, to provide neither flow parameter measurement values of the first type nor flow parameter measurement values of the second type that are greater than zero.

A basic concept of the invention consists of utilizing the fact that, in measurement systems of the type in question, the vortex sensor signal typically also contains at least one spectral signal component that corresponds to or represents a mechanical resonant frequency intrinsic to the vortex sensor, specifically when fluid flows past the vortex sensor, possibly also at excessive flow speed, such that, when a Kármán vortex street is not formed, it is possible to detect whether the fluid is flowing or not on the basis of the occurrence of said spectral signal component. Furthermore, it has also been recognized that, in measurement systems of the type in question, if no Kármán vortex street forms at the vortex sensor despite the fluid flowing, it can generally be assumed that the fluid is not flowing past the bluff body and the vortex sensor exactly at a flow speed corresponding to its acoustic velocity, and that conversely, with knowledge of the composition of the fluid and its thermodynamic state, said acoustic velocity can again be determined and output as flow speed.

One advantage of the invention can also be seen, inter alia, in the fact that at least the detection of excessive flow velocities, possibly even their exact calculation, can frequently be set up solely by a corresponding modification of the calculation algorithm, typically implemented as firmware and/or software in the transducer electronics of modern measurement systems, for example even specifically added on simply by means of a corresponding upgrade of the firmware or software in the case of already installed measurement systems.

BRIEF DESCRIPTION OF THE DRAWINGS

The invention as well as advantageous embodiments thereof are explained in more detail below based on exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, in particular combinations of partial aspects of the invention that were initially explained only separately, furthermore result from the figures of the drawing and from the claims themselves.

The figures show in detail.

DETAILED DESCRIPTION

Figure 1:
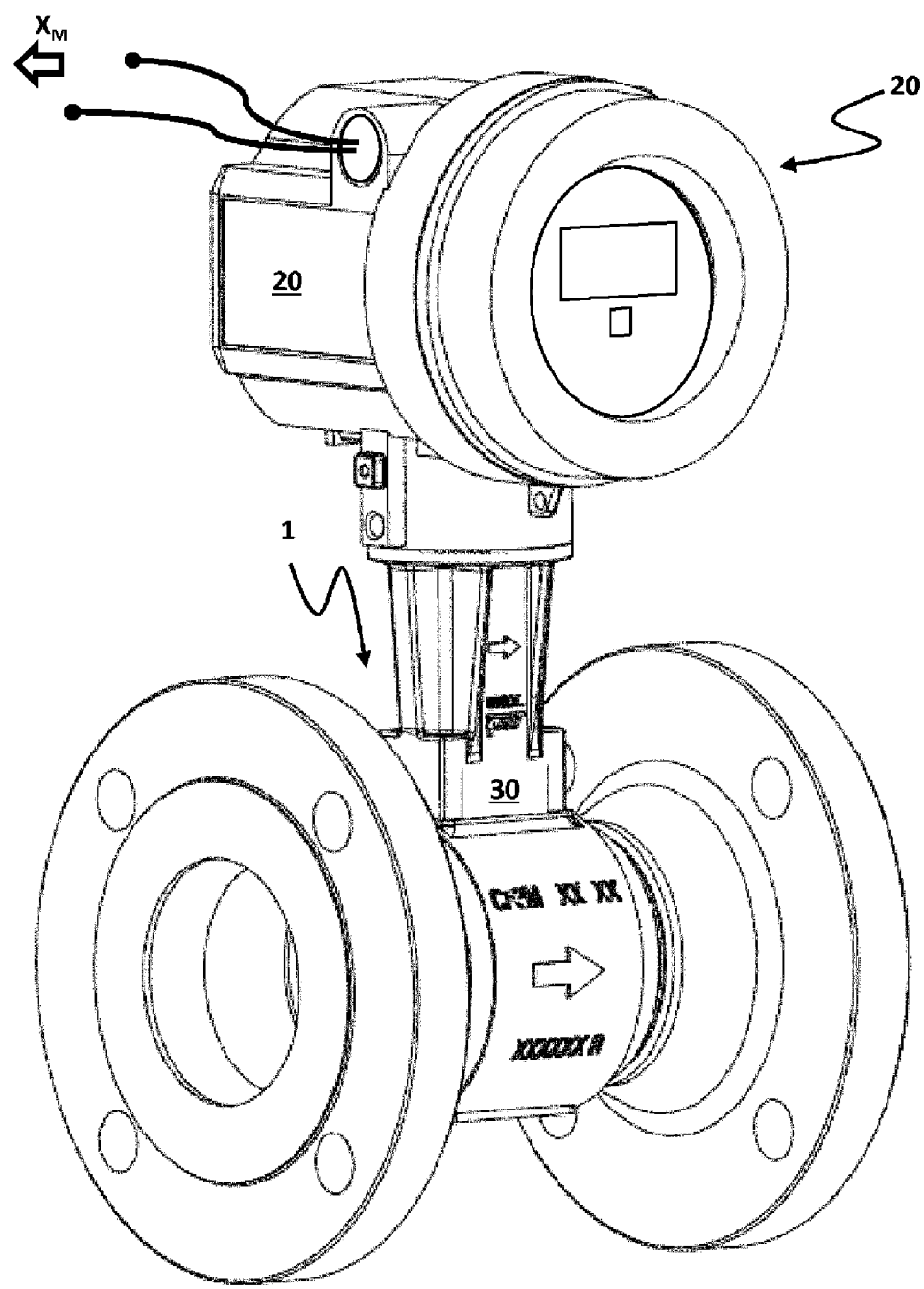
FIGS. 1 and 2 show various schematic views of a measurement system, in this case in the form of a vortex flow meter, having a vortex sensor and transducer electronics for measuring at least one flow parameter of a fluid flowing in a pipe.
Figure 2:
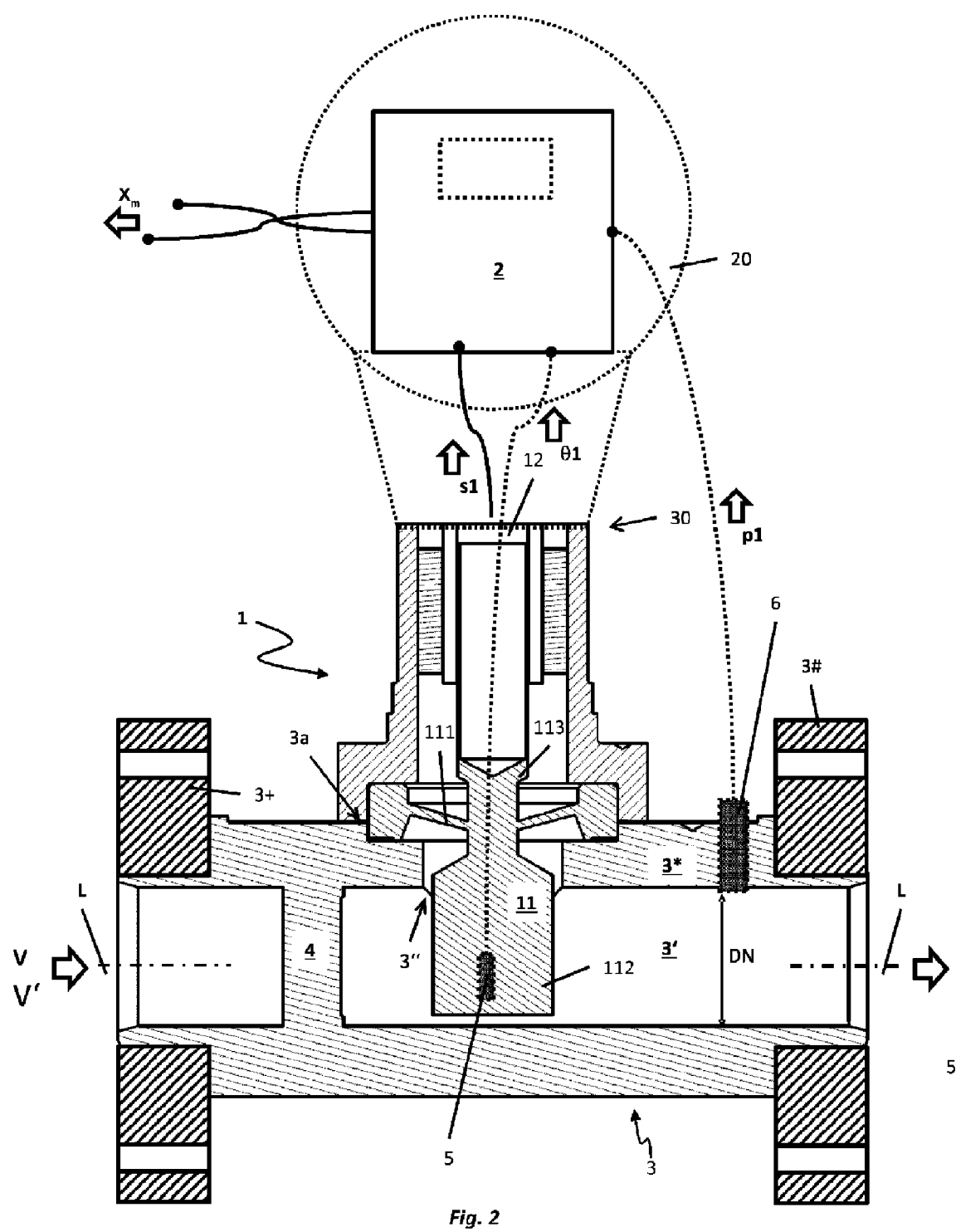

FIGS. 1 and 2 show an exemplary embodiment of a measurement system for measuring at least one flow parameter, which possibly also varies over time, for example specifically a flow speed u and/or a volume flow rate and/or mass flow rate, of a fluid flowing in a pipe, for example a gas or an aerosol. The pipe can be designed, for example, as a plant component of a heat supply network or of a turbine circuit, and therefore the fluid can be, for example, steam, especially saturated steam or superheated steam, or else, for example, a condensate discharged from a steam line. However, fluid can also be, for example, (compressed) natural gas or a biogas, so that the pipe can also be a component of a natural gas or biogas plant or of a gas supply network, for example. According to a further embodiment of the invention, the measurement system is also provided for measuring the at least one flow parameter even when the fluid flows at an increased flow speed, specifically a flow speed more than 0.3 times its current acoustic velocity c, and therefore corresponding to a Mach number Ma (Ma=u/c) of more than 0.3 (Ma>0.3), through the pipe section supplying the fluid to the measurement system, as can occasionally be observed for example during the startup of a steam-carrying plant component, for example in a heat supply network or in a turbine circuit.

Figure 3:
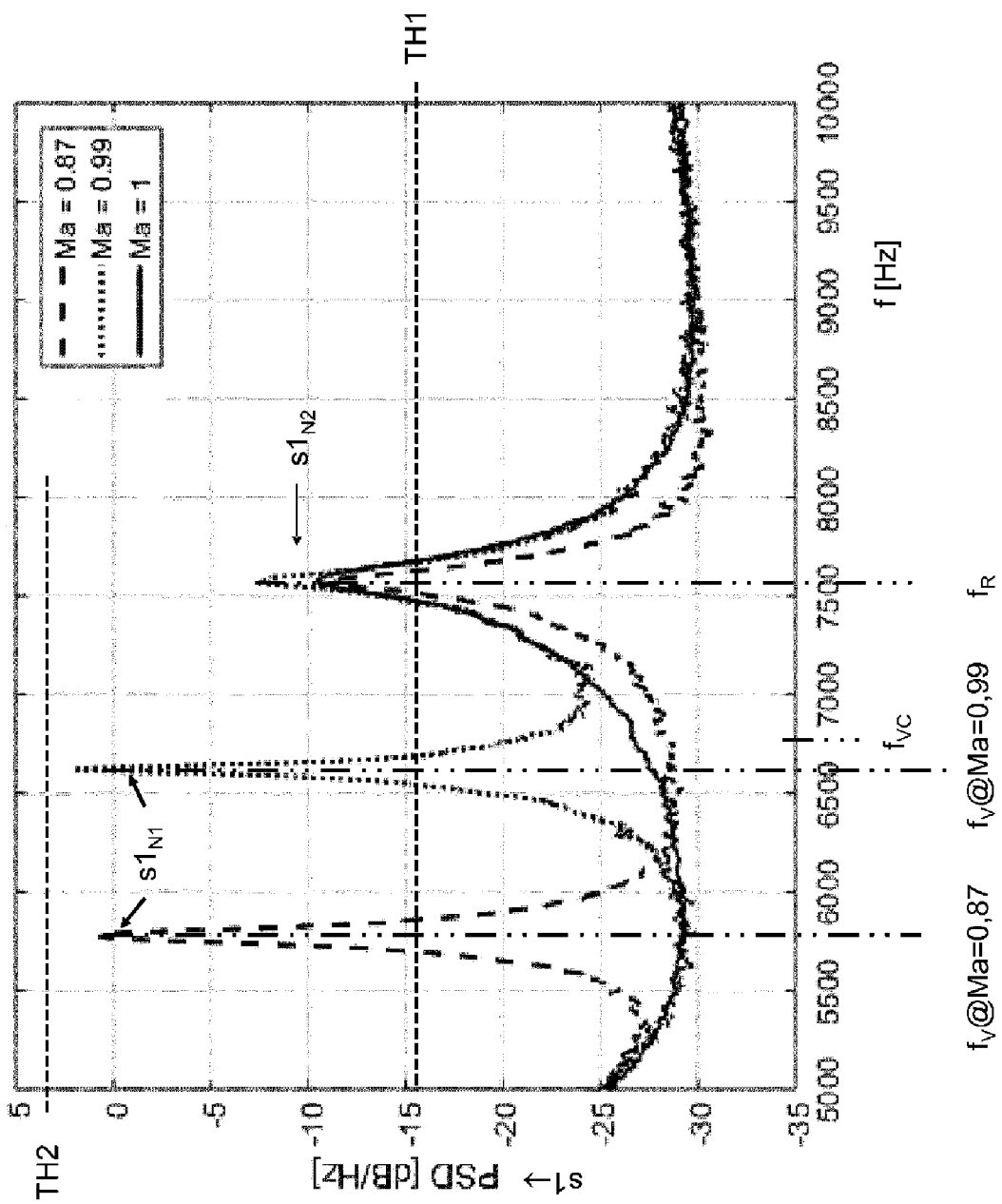
FIG. 3 shows exemplary power spectral densities of vortex sensor signals generated by means of a measurement system according to FIGS. 1 and 2 at different flow speeds.
Figure 4A:
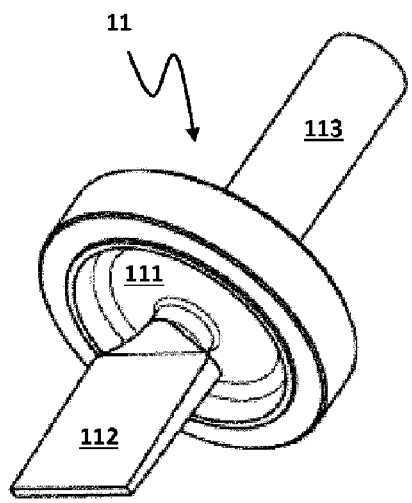
FIGS. 4a, 4d show schematically, in some cases also cut-away, views of an exemplary embodiment of a vortex sensor suitable for use in a measurement system according to FIGS. 1 and 2.
Figure 4B:
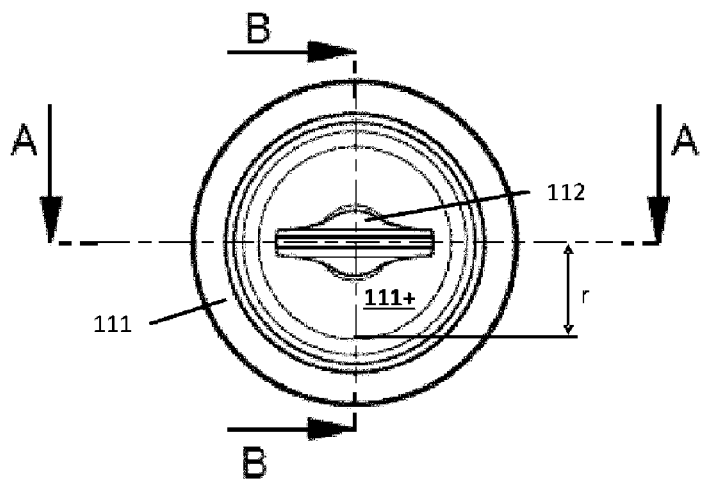
Figure 4C:
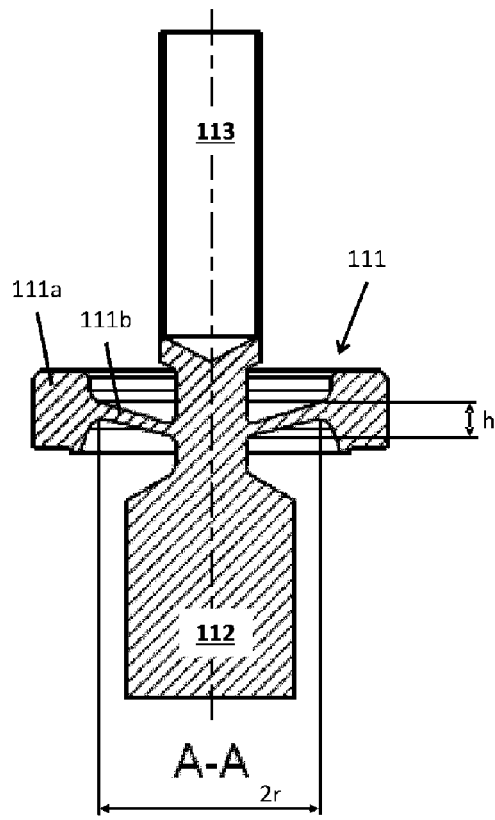
Figure 4D:
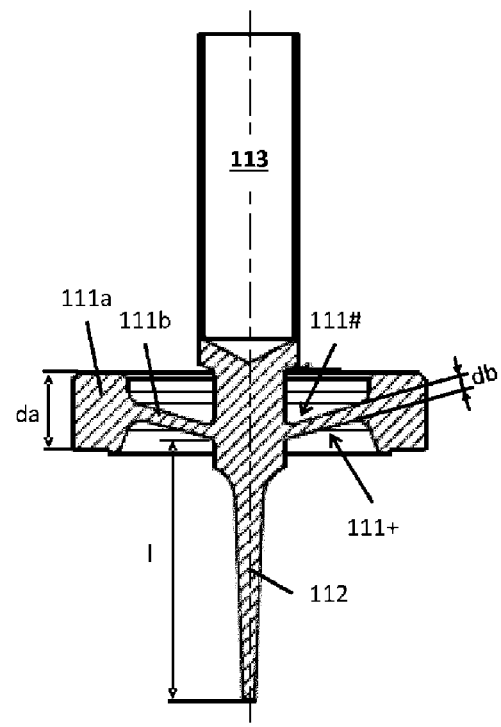

The measurement system comprises a tube 3 that can be inserted in the course of the aforementioned pipe and has a lumen 3' that is surrounded by a wall 3*, for example a metallic wall, of the tube and extends from an inlet end 3+ to an outlet end 3 # and is configured to guide the fluid flowing in the pipe and for said fluid to flow through it in the direction of a main flow direction of the measurement system. In the exemplary embodiment shown here, there is at both the inlet end 3+ and the outlet end 3 # a flange, which is used in each case to produce a leak-free flange connection to a respective corresponding flange on an inlet-side or outlet-side line segment of the pipe. Furthermore, as shown in FIG. 1 or 2, the tube 3 can be substantially straight, for example specifically in the form of a hollow cylinder with a circular cross section, at least in sections, in such a way that the tube 3 has an imaginary straight longitudinal axis L connecting the inlet end 3+ and the outlet end 3 #. The measurement system also has: a bluff body 4, for example a prismatic or cylindrical bluff body, which is arranged inside the lumen 3' and is configured to generate vortices in the fluid flowing past at a shedding frequency $f_V$ ($f_V$~u) dependent on a current flow speed u of said fluid, such that a Kármán vortex street is formed in the fluid flowing downstream of the bluff body; and a vortex sensor 1, which is for example arranged downstream of the bluff body 4 or is integrated therein, for detecting vortices of the Kármán vortex street, for example specifically periodic pressure fluctuations associated therewith, specifically at constant flow speed u, in the flowing fluid. Said vortex sensor 1 is especially configured to provide at least one vortex sensor signal s1, especially an electrical or optical vortex sensor signal, which changes over time, and for example specifically corresponds with the aforementioned pressure fluctuations; this is done especially in such a manner that the vortex sensor signal s1 contains, as can also be easily seen in FIG. 3, a first useful component $s1_{N1}$, specifically a first spectral signal component (@$f_V$) that represents the shedding frequency $f_V$, and for example is not below a predetermined threshold value TH1 for signal noise, specifically having at least a minimum spectral power density or a corresponding minimum amplitude, and/or is not above a threshold value TH2 for signal noise, specifically having at most a maximum spectral power density or a corresponding maximum amplitude, if a Kármán vortex street is formed in the fluid flowing downstream of the bluff body. Given that the vortex sensor 1 naturally also has a plurality of natural oscillation modes, of which one or more can be excited during operation of the measurement system, the vortex sensor signal typically also contains, as is also readily apparent from FIG. 3, one or more spectral signal components, which correspond to a respective resonant frequency ($f_R$) of one of the aforementioned oscillation modes. In particular, it has been found that the vortex sensor 1 can also be excited by the fluid flowing past it to vibrations at one or more of the aforementioned resonant frequencies, or conversely that at least one of the aforementioned vibrations is not excited significantly or at all if no fluid flows past the vortex sensor. Accordingly, the vortex sensor signal also at least temporarily contains, as is also readily apparent from FIG. 3, at least one second spectral signal component (@$f_R$), which is especially not below a predetermined first threshold value for signal noise (TH1) and/or not above a second threshold value for signal noise (TH2) with regard to a spectral power density or amplitude and represents a mechanical resonant frequency $f_R$ of the vortex sensor, for example a lowest resonant frequency and/or a resonant frequency that is always above the shedding frequency $f_V$ and/or a resonant frequency of a natural oscillation mode serving to detect the vortices; and especially this is the case when fluid is flowing past the vortex sensor and/or this is not the case when there is no fluid flowing past the vortex sensor.

According to a further embodiment of the invention, the measurement system comprises a temperature sensor 5 that is configured to provide at least one temperature sensor signal θ1 that follows a change in a temperature of the flowing fluid with a change in at least one signal parameter, and/or the measurement system has a pressure sensor 6 that is configured to provide at least one pressure sensor signal p1 that follows a change in a pressure, especially a static pressure, of the flowing fluid with a change in at least one signal parameter. The temperature sensor can be arranged, for example, downstream of the bluff body, possibly also within the vortex sensor or, as shown schematically in FIG. 2, within the bluff body. Furthermore, the pressure sensor can also be arranged downstream of the bluff body or inside the bluff body, for example.

According to another embodiment of the invention, the vortex sensor 1 is formed, as shown in each of FIG. 2 and FIGS. 4a, 4b, 4c, 4d and can be seen easily when said figures are viewed together, by means of a deformation element 111, especially a diaphragm-like or disk-shaped deformation element, and a sensor lug 112 that has a left-hand first side face 112+ and a right-hand second side face 112 # and extends from a first surface 111+ of the deformation element 111 to a distal (free) end specifically remote from the deformation element 111 and its surface 111+ and is configured for flowing fluid to flow around it. In this case, the vortex sensor and the bluff body are especially dimensioned and arranged such that the sensor lug 112 projects into the lumen 3* of the tube or the fluid guided therein in a region usually taken up by the Kármán vortex street when the measurement system is in operation. The deformation element 111 furthermore has a second surface 111 # that is opposite the first surface 111+, for example at least partially parallel to the first surface 111+, and an outer edge segment 111a, which is for example circular-ring-shaped and/or provided with a sealing face. The outer edge segment 111a has a thickness that, as indicated in FIGS. 2 and 4a, 4b, 4c, 4d, is substantially greater than a minimum thickness of an inner segment 111b enclosed by said edge segment 111a and in this case specifically supports the sensor lug 112. The deformation element 111 and the sensor lug 112 are especially configured to be excited to forced oscillations about a common static rest position in such a way that the sensor lug 112 executes pendular movements that elastically deform the deformation element 111 in a detection direction running substantially transversely to the aforementioned main flow direction, or oscillation movements according to a natural oscillation mode intrinsic to the vortex sensor. According to a further embodiment of the invention, the sensor lug 112 accordingly has a width b, measured as a maximum extent in the direction of the main flow direction, which is substantially greater than a thickness d of the sensor lug 112, measured as a maximum lateral extent in the direction of the detection direction. In the exemplary embodiment shown in FIGS. 4a, 4b, 4c, 4d, the sensor lug 112 is substantially wedge-shaped; however, it can also be designed as a relatively thin flat plate, for example, as is quite usual for such vortex sensors. According to a further embodiment of the invention, the vortex sensor 1 and the tube 3 are further dimensioned such that a length l of the sensor lug 112, measured as the minimum distance between a proximal end of the sensor lug 112 specifically bordering the deformation element 111 and the distal end of the sensor lug 112, corresponds to more than half of a caliber DN of the tube 3 and less than 95% of said caliber DN. For example, the length l can also be selected, as is quite usual with a comparatively small caliber of less than 50 mm, in such a way that said distal end of the sensor lug 112 has only a very small minimum distance from the wall 3* of the tube 3. In the case of tubes with a comparatively large caliber of 50 mm or more, the sensor lug 112 can also, as is quite usual in the case of measurement systems of the type in question or as can also be seen from FIG. 2, be significantly shorter than half of a caliber of the tube 3, for example. The deformation element 111 and the sensor lug 112 can furthermore be, for example, components of one and the same monolithic molded part that is cast or produced by an additive manufacturing process such as 3D laser melting, for example; however, the deformation element and the sensor lug can also be designed as individual parts that are initially separate from one another and are only subsequently integrally bonded to each other, for example specifically welded or soldered to one another, and therefore produced from materials that can correspondingly be integrally bonded to each other. As is quite usual with such vortex sensors, the deformation element 111 can consist at least partially, for example specifically predominantly or completely, of a metal such as stainless steel or a nickel-based alloy. The sensor lug can likewise consist at least partially of a metal, for example specifically a stainless steel or a nickel-based alloy; the deformation element 111 and the sensor lug 112 can especially also be produced from the same material. Furthermore, the vortex sensor has a transducer element 12, for example a capacitive transducer element designed as a piezoelectric transducer, as a component of a capacitor or else for example an optical transducer element designed as a component of a photodetector, for generating a signal that represents movements of the sensor lug that change over time and are typically specifically at least intermittently periodic and at the same time deformations of the deformation element 111 that change over time, and in this case also acts as a vortex sensor signal, for example a variable electrical voltage modulated by the aforementioned movements or correspondingly modulated laser light. The vortex sensor 1 is also inserted into the tube 3 in such a way that the first surface of the deformation element 111 faces the lumen 3' of the tube, so that the sensor lug projects into said lumen.

In the exemplary embodiment shown in FIGS. 1 and 2, the vortex sensor 1 is inserted into the lumen of the tube from the outside through an opening 3" formed in the wall and is fixed, for example also releasably, from the outside to the wall 3* in the region of said opening in such a way that the surface 111+ of the deformation element 111 faces the lumen 3' of the tube 3 and therefore the sensor lug 112 protrudes into said lumen. In particular, the sensor 1 is inserted into the opening 3" in such a way that the deformation element 111 covers or hermetically seals the opening 3". Said opening can be designed, for example, in such a way that it has, as is quite usual in measurement systems of the type in question, an (inner) diameter in a range between 10 mm and approximately 50 mm. According to a further embodiment of the invention, a socket 3a used to hold the deformation element on the wall 3* is formed in the opening 3". In this case, the vortex sensor 1 can, for example, be fixed to the tube 3 by integral bonding, especially by welding or soldering, of the deformation element 111 and wall 3*; however, it can for example also be detachably connected to the tube 3, for example specifically screwed thereto or screwed thereon. Furthermore, at least one sealing face, for example also a circumferential or circular-ring-shaped sealing face, can be formed in the socket 3a and is configured to seal the opening 3" correspondingly in cooperation with the deformation element 111 and an optionally provided, for example annular or annular disk-shaped, sealing element. Not least if the vortex sensor is to be inserted into the aforementioned socket 3a and connected detachably to the tube 3, the edge segment 111a of the deformation element 111 can advantageously also be provided with a sealing face, which for example also corresponds with the sealing face possibly provided in the opening 3" and/or is circular-ring-shaped.

According to a further embodiment of the invention, in order to compensate for forces and/or moments resulting from random movements of the vortex sensor, for example as a result of vibration of the aforementioned pipe connected to the tube, or to avoid undesired movements of the sensor lug or of the deformation element 111 resulting therefrom and specifically distorting the sensor signal s1, the vortex sensor 1 further has a compensating element 114, for example a rod-shaped, planar or sleeve-shaped compensating element, extending from the second surface 111 # of the deformation element 111. Said compensating element 114 can also be used as a holder of the transducer element 12 or else be used as a component of the transducer element 12, for example as a movable electrode of a capacitor forming said (capacitive) transducer element. The compensating element 114 can, for example, consist of the same material as the deformation element and/or the sensor lug, for example a metal. For example, the compensating element 114 can be produced from a stainless steel or a nickel-based alloy. According to a further embodiment of the invention, the deformation element 111 and the compensating element 114 are integrally bonded to one another, for example welded or soldered to one another, and therefore the compensating element 114 and the deformation element 111 are produced from materials that can be integrally bonded to one another accordingly. Alternatively, however, the deformation element 111 and the compensating element 114 can also be components of one and the same monolithic molded part, for example also in such a way that the sensor lug 111, the deformation element 112 and the compensating element 114 are components of said molded part. The sensor lug 112 and the compensating element 114 can also be aligned with one another, as can also be seen by viewing FIGS. 4c and 4d together, in such a way that a main axis of inertia of the sensor lug 112 coincides in extension with a main axis of inertia of the compensating element 114. Alternatively or in addition, the compensating element 114 and the deformation element 111 can also be positioned and aligned with one another such that a main axis of inertia of the deformation element 111 coincides in extension with a main axis of inertia of the compensating element 114. Furthermore, the sensor lug 112, the compensating element 114 and the deformation element 111 can also be positioned and aligned with one another, as can also be seen by viewing FIGS. 2, 4a, 4b, 4c and 4d together, such that a main axis of inertia of the vortex sensor 11 runs parallel to a main axis of inertia of the sensor lug 112 and to a main axis of inertia of the compensating element 114 and also to a main axis of inertia of the deformation element 111 or coincides with a said main axis of inertia of the sensor lug and with said main axis of inertia of the compensating element and also with said main axis of inertia of the deformation element.

For processing or evaluating the at least one vortex sensor signal, the measurement system further comprises transducer electronics 2, which is for example accommodated in a pressure- and/or impact-proof protective housing 20 and is connected to the sensor 1 and communicates with the vortex sensor 1 during operation of the measurement system. The protective housing 20 for the transducer electronics 2 can, for example, be produced from a metal, such as a stainless steel or aluminum, and/or by means of a casting method, such as an investment casting or die casting method (HPDC); it can however, for example, also be formed by means of a plastic molded part produced in an injection molding method. In the exemplary embodiment shown here, the measurement system is also designed as a compact type vortex flow meter in which the protective housing 20 with the transducer electronics 2 accommodated therein is held on the tube, for example by means of a neck-like connecting piece 30. The transducer electronics 2, formed for example by means of at least one microprocessor, are configured, inter alia, to receive the vortex sensor signal s1 and to generate, using the at least one vortex sensor signal s1, measurement values $X_M$, possibly also in the form of digital measurement values, representing the at least one flow parameter, for example the flow speed v or the volume flow rate or mass flow rate V'. The measurement values $X_M$, for example the digital measurement values, can, for example, be visualized in situ and/or be transmitted in a wired manner via a connected field bus and/or in a wireless manner via radio to an electronic data processing system, for example a programmable logic controller (PLC) and/or a process control station.

Accordingly, according to a further embodiment, the measurement system has a display element coupled to its transducer electronics 2 and/or at least one data output for outputting data provided by the transducer electronics 2, for example the measurement values $X_M$ for the at least one flow parameter, and/or messages generated by means of the transducer electronics 2. According to a further embodiment of the invention, not least if at least one microprocessor is provided in the transducer electronics 2 to process the vortex sensor signal and to determine digital measurement values representing the at least one flow parameter, the transducer electronics can have at least one converter circuit A/D, which is configured to receive and digitize the at least one vortex sensor signal, especially specifically to convert it into a digital vortex sensor signal and to provide said digital vortex sensor signal at a digital output of the converter circuit. For the aforementioned case in which the measurement system has the temperature sensor and/or the pressure sensor, the transducer electronics 2 are further configured also to receive the at least one temperature sensor signal and/or the at least one pressure sensor signal, and the transducer electronics 2 are also configured to determine, using the at least one temperature sensor signal, temperature measurement values $X_\Theta$ representing the temperature of the fluid and/or to determine, using the at least one pressure sensor signal, pressure measurement values $X_p$ representing the pressure of the fluid.

As already mentioned, the vortex sensor and the measurement system formed therewith is especially also intended to be used in such a plant in which the fluid to be measured is allowed to flow in the supplying pipe nominally at a comparatively high flow speed, for example corresponding specifically to approximately 0.3 times its acoustic velocity. Investigations on such measurement points formed by means of conventional measurement systems of the type in question have shown that situations can also occur, especially during startup of the plant in question, in which the flow speed inside the tube can temporarily also be above a maximum flow speed specified for said measurement system, in such a way that the fluid flowing past the bluff body then has a flow speed u corresponding to its current acoustic velocity c (c=u/Ma). Furthermore, it has been found that, at such a high flow speed, vortices are no longer shed from the bluff body, and therefore no Kármán vortex street is formed in the fluid flowing downstream of the bluff body. As a result, as can also be seen in FIG. 3, the first useful component $s1_{N1}$ is also no longer present in the vortex sensor signal during this period. However, further investigations have also shown that, even though no Kármán vortex street is formed in the flowing fluid, at least one of the aforementioned natural oscillation modes can also be excited at its current resonant frequency as a result of the fluid flowing past the vortex sensor at an excessive flow speed, such that, as can also be seen in FIG. 3, the vortex sensor signal contains at least one of the aforementioned spectral signal components corresponding to one of the resonant frequencies of the vortex sensor at a comparatively high signal level even when the first useful component is not present. It has also been shown that here, for example, the signal component that represents a lowest mechanical resonant frequency of the vortex sensor can also have a comparatively high signal level. For a vortex sensor corresponding to the exemplary embodiment shown in FIGS. 1 and 2, said lowest mechanical resonant frequency corresponds, for example, to the resonant frequency of the natural oscillation mode of the vortex sensor in which the sensor lug 112 executes the aforementioned pendular movements elastically deforming the deformation element 111 in the detection direction.

In order to avoid an erroneous measurement of the flow parameter during the time period in which no Kármán vortex street is formed downstream of the bluff body, the transducer electronics 2 of the measurement system according to the invention are especially configured to determine whether the first useful component $s1_{N1}$ and/or at least the aforementioned second spectral signal component ($©f_R$), referred to below as second useful component $s1_{N2}$, is present in the at least one vortex sensor signal. In addition, the transducer electronics 2 are configured, if the first useful component is present in the at least one vortex sensor signal s1, to determine vortex frequency measurement values $X_f$, for example also digital vortex frequency measurement values, representing the shedding frequency $f_V$ on the basis of the first useful component of the at least one vortex sensor signal, and to provide flow parameter measurement values of the first type, specifically measurement values $X_M$, possibly also digital measurement values, calculated using one or more vortex frequency measurement values $X_f$, for the at least one flow parameter; and to do this especially such that the transducer electronics 2 calculate the flow parameter measurement values of the first type according to the vortex meter principle and/or also using a Strouhal number Sr (Sr~$f_v$/u), specifically a characteristic number representing a ratio of the shedding frequency $f_V$ to the flow speed u of the fluid flowing past the bluff body. The flow parameter measurement values of the first type can accordingly be flow parameter measurement values that can be determined or have been determined in a conventional manner, specifically also in conventional measurement systems of the type in question. Furthermore, the transducer electronics 2 of the measurement system according to the invention are however also configured, if the first useful component is not present or is not determined in the at least one vortex sensor signal, but the second useful component is determined in the at least one vortex sensor signal, to generate a message of the first type, for example also acting as an alarm, which indicates that the current flow speed u of the fluid flowing past the bluff body is not lower than a current acoustic velocity c (c=u/Ma) of said fluid, and therefore no Kármán vortex street is currently formed in the fluid flowing around the vortex sensor 3 and/or the measurement system is currently operating outside a measurement range previously specified therefor. Alternatively or in addition, the transducer electronics 2 of the measurement system according to the invention are additionally configured, in the aforementioned case in which the first useful component is not present in the at least one vortex sensor signal or is not determined correspondingly, but the second useful component is determined in the at least one vortex sensor signal, to provide no flow parameter measurement values of the first type or to generate a corresponding control command, which specifically prevents output of flow parameter measurement values of the first type, for example such that a calculation algorithm in the transducer electronics 2 that would otherwise bring about the determination of flow parameter measurement values of the first type (according to the vortex meter principle) is temporarily not executed. Accordingly, according to a further embodiment of the invention, the transducer electronics 2 can also be configured, only if the first useful component is present in the at least one vortex sensor signal s1, to generate a control command prompting output of flow parameter measurement values of the first type and/or, if neither the first useful component nor the second useful component is present or is determined in the at least one vortex sensor signal, to generate and output a message of the second type, specifically a message that indicates that there is currently no fluid flowing through the tube 3. The aforementioned messages of the first, possibly also second type and/or the aforementioned flow parameter measurement values can be output, for example, by means of the aforementioned display element and/or at the aforementioned data output, for example visualized in situ or sent to an electronic data processing system connected to the measurement system.

Further investigations with measurement systems of the type in question, not least also with typical conventional measurement systems with a straight tube and a predominantly circular cylindrical lumen and/or with flow cross sections of substantially equal size directly upstream and directly downstream of the bluff body, have further shown that, in the immediate vicinity of the bluff body in question, therefore also in the region of the vortex sensor in each case, the fluid flowing there can generally reach at most flow speeds that are not higher than a maximum flow speed that can be exactly determined previously or during operation of the measurement system; this is done especially in such a manner that, in the interaction of the respective tube and the bluff body accommodated therein, a critical flow nozzle, sometimes also referred to as a sonic nozzle, is formed, specifically a nozzle in which the flow speed u of the fluid flowing past the bluff body has reached the aforementioned maximum flow speed and said flow speed u is equal to the current acoustic velocity of the fluid, and therefore corresponds to a Mach number Ma (Ma=u/c) of one (Ma=1), and that, if there is a further increase in the aforementioned increased flow speeds of the fluid flowing in the pipe section supplying the fluid to the measurement system, for example, to a flow speed corresponding to a Mach number of 0.4, the flow speed u of the fluid flowing past the bluff body no longer increases. As a result, it was thus possible to establish that, with measurement systems of the type in question, surprisingly and pleasingly precisely for the mentioned case in which the Kármán vortex street does not form owing to an excessively high flow speed, and therefore a first useful component is not present in the vortex sensor signal, a constant flow speed, specifically a flow speed that initially can no longer be increased further, is produced for the fluid flowing past the bluff body. Accordingly, according to a further embodiment of the invention, the transducer electronics 2 are further configured to determine the Mach number Ma (Ma=u/c) for the fluid flowing past the bluff body, for example also to determine or calculate Mach number measurement values $X_{Ma}$ representing said Mach number, using the at least one vortex sensor signal. For example, the transducer electronics 2 can then also be configured, for the aforementioned case in which the second useful component is present in the at least one vortex sensor signal but the first useful component is not present or is not determined in the at least one vortex sensor signal, to set the Mach number measurement value $X_{Ma}$ to a predetermined fixed value, for example specifically to a Mach number corresponding to the aforementioned maximum flow speed and/or to one (Ma=1) or to output said predetermined fixed value as a Mach number measurement value $X_{Ma}$.

The acoustic velocity c or the aforementioned maximum flow speed corresponding to the acoustic velocity c can also be ascertained sufficiently accurately, for example, on the basis of the current temperature of the fluid and/or on the basis of a current pressure of the fluid during operation of the measurement system, for example specifically using a model of an ideal gas for the respective fluid. According to a further embodiment of the invention, for the mentioned case in which the measurement system comprises the aforementioned temperature sensor and the transducer electronics 2 are also configured to receive the at least one temperature sensor signal and, on the basis thereof, to determine temperature measurement values $X_\theta$ representing a temperature of the fluid, the transducer electronics 2 are accordingly also configured to provide flow parameter measurement values of the second type, specifically measurement values calculated using one or more temperature measurement values, but without using a vortex frequency measurement value, for the at least one flow parameter, and/or the transducer electronics 2 are configured to determine the acoustic velocity c (c=u/Ma) of the fluid flowing past the bluff body, for example to calculate and output acoustic velocity measurement values $X_c$ representing said acoustic velocity; this is done, for example, in such a manner that flow parameter measurement values of the second type are also calculated using one or more acoustic velocity measurement values $X_c$ and acoustic velocity measurement values $X_c$ are output as flow parameter measurement values of the second type. Alternatively or in addition, the transducer electronics 2 can also be configured to determine the aforementioned Mach number measurement values $X_{Ma}$ using both the at least one vortex sensor signal and the temperature sensor signal, for example specifically on the basis of temperature measurement values obtained therefrom, and/or to calculate at least the flow parameter measurement values of the second type also using one or more Mach number measurement values $X_{Ma}$. According to a further embodiment of the invention, for the mentioned other case in which the measurement system also comprises the aforementioned pressure sensor 6 and the transducer electronics 2 are further configured to receive the at least one pressure sensor signal and to determine, on the basis thereof, pressure measurement values $X_p$ representing a pressure of the fluid, the transducer electronics 2 are accordingly further configured to calculate the flow parameter measurement values of the second type for the at least one flow parameter also using one or more pressure measurement values $X_p$. Alternatively or in addition, the transducer electronics 2 can also be configured to calculate the aforementioned acoustic velocity measurement values $X_c$ and/or Mach number measurement values $X_{Ma}$ using one or more pressure measurement values $X_p$. In order to be able to use the aforementioned calculation algorithm for the flow parameter measurement values of the first type also for determining flow parameter measurement values of the second type, the transducer electronics 2 can further also be configured, if the second useful component is present in the at least one vortex sensor signal but the first useful component is not present or is not determined in the at least one vortex sensor signal, to determine an equivalence frequency $f_{vc}$ ($f_{vc}$~Sr·c), specifically a certain frequency corresponding to a theoretical shedding frequency with fluid flowing at acoustic velocity c, for example on the basis of the temperature and/or the acoustic velocity c, and to use the temperature measurement values and/or acoustic velocity measurement values determined therefor and said equivalence frequency $f_{vc}$ correspondingly for determining measurement values $X_M$ for the at least one flow parameter.

According to a further embodiment of the invention, the transducer electronics 2 are configured, if the second useful component is present in the at least one vortex sensor signal but the first useful component is not present or is not determined in the at least one vortex sensor signal, to generate a control command prompting output of flow parameter measurement values of the second type or to output the flow parameter measurement values of the second type. In addition, the transducer electronics 2 can also be configured, if the first useful component is present in the at least one vortex sensor signal, to generate a control command that prevents the output of flow parameter measurement values of the second type or to output no flow parameter measurement values of the second type. Alternatively or in addition, the transducer electronics 2 are further configured, if neither the first useful component nor the second useful component is present or determined in the at least one vortex sensor signal, to provide neither flow parameter measurement values of the first type nor flow parameter measurement values of the second type that are greater than zero.

For processing the vortex sensor signal, the transducer electronics 2 according to a further embodiment have a first signal filter, for example designed as a component of the aforementioned converter circuit A/D, which is configured to receive the vortex sensor signal at a signal input and to provide at a filter output a first useful signal containing the first useful component of the vortex sensor signal, but especially specifically always containing the second useful component only in attenuated form or not at all. Using said first useful signal, for example also digital first useful signal, the transducer electronics can also determine whether the first useful component is present in the at least one vortex sensor signal, for example by comparing a signal amplitude (or a spectral power density) of said useful signal with a reference value (TH1) correspondingly predetermined for the first useful component. As an alternative or in addition, the transducer electronics 2 have a second signal filter, for example designed as a component of the aforementioned converter circuit A/D, which is configured to receive the vortex sensor signal at a signal input and to provide at a filter output a second useful signal containing the second useful component of the vortex sensor signal, but especially specifically always containing the first useful component only in attenuated form or not at all. Using the second useful signal, for example digital second useful signal, the transducer electronics 2 can determine whether the second useful component is present in the at least one vortex sensor signal, for example by comparing a signal amplitude (or a spectral power density) of said useful signal with a reference value (TH1) correspondingly predetermined for the second useful component. As an alternative or in addition, the transducer electronics 2 can also be configured to generate a discrete Fourier transform (DFT) and/or an autocorrelation (AKF) of the at least one vortex sensor signal in order then to determine, on the basis of said discrete Fourier transform of the at least one vortex sensor signal or on the basis of said autocorrelation (AKF) of the at least one vortex sensor signal, whether the first useful component and/or the second useful component is present in the at least one vortex sensor signal.

The invention claimed is:

1. A measurement system for measuring at least one flow parameter of a fluid flowing in a pipe, the measurement system comprising:
    a tube configured to be insertable in a course of the pipe and having a lumen that is configured to guide the fluid flowing in the pipe and for the fluid to flow through it;
    a bluff body arranged in the lumen of the tube and configured to generate vortices in the fluid flowing past at a shedding frequency dependent on a current flow speed of the fluid, such that a Karman vortex street is formed in the fluid flowing downstream of the bluff body;
    a vortex sensor arranged downstream of the bluff body or integrated therein, which:
        has at least one mechanical resonant frequency, which is a lowest resonant frequency and/or is always above the shedding frequency;

is configured to generate at least one vortex sensor signal that changes over time;

includes a spectral first signal component that represents the shedding frequency and has a signal level not below a predetermined threshold value for signal noise when a Karman vortex street is formed in the fluid flowing downstream of the bluff body; and includes a spectral second signal component that represents the at least one mechanical resonant frequency of the vortex sensor and has a signal level not below the predetermined threshold value for signal noise when fluid flows past the vortex sensor; and transducer electronics, including a microprocessor, configured to evaluate the at least one vortex sensor signal and determine measurement values for the at least one flow parameter, wherein the transducer electronics are configured:

to receive the at least one vortex sensor signal and to determine whether the first signal component and/or the second signal component is present in the at least one vortex sensor signal;

when the first signal component is present in the at least one vortex sensor signal:
to determine vortex frequency measurement values representing the shedding frequency based on the first signal component of the at least one vortex sensor signal; and
to generate flow parameter measurement values of a first type, including measurement values, calculated using one or more vortex frequency measurement values for the at least one flow parameter;

when the first signal component is not present or is not determined in the at least one vortex sensor signal, and when the second signal component is present or is determined in the at least one vortex sensor signal:
not to generate any flow parameter measurement values of the first type; and/or
to generate a control command that prevents output of flow parameter measurement values of the first type; and/or
to generate and output a message indicating the current flow speed of the fluid flowing past the bluff body is not lower than a current acoustic velocity of the fluid or is equal to the current acoustic velocity thereof, thereby corresponding to a Mach number of one.

2. The measurement system of claim 1, wherein the transducer electronics are further configured, when the first signal component is present in the at least one vortex sensor signal, to generate a control command prompting output of flow parameter measurement values of the first type.

3. The measurement system of claim 1, wherein the transducer electronics include a first signal filter configured to receive the at least one vortex sensor signal at a signal input and to provide at a filter output a first useful signal, containing the first signal component of the vortex sensor signal but containing the second signal component only in attenuated form or not at all, and/or wherein the transducer electronics include a second signal filter configured to receive the vortex sensor signal at a signal input and to provide at a filter output a second useful signal, containing the second signal component of the vortex sensor signal but containing the first signal component only in attenuated form or not at all.

4. The measurement system of claim 3, wherein the transducer electronics are further configured to:

determine, using the first useful signal, whether the first signal component is present in the at least one vortex sensor signal; and/or determine, using the second useful signal, whether the second signal component is present in the at least one vortex sensor signal.

5. The measurement system of claim 1, wherein the transducer electronics are further configured to:
generate a discrete Fourier transform of the at least one vortex sensor signal; and
determine, based on the discrete Fourier transform of the at least one vortex sensor signal, whether the first signal component and/or the second signal component is present in the at least one vortex sensor signal.

6. The measurement system of claim 1, wherein the transducer electronics are further configured to:
calculate an autocorrelation of the at least one vortex sensor signal; and
determine, based on the autocorrelation of the at least one vortex sensor signal, whether the first signal component and/or the second signal component is present in the at least one vortex sensor signal.

7. The measurement system of claim 1, wherein the transducer electronics include at least one converter circuit configured to receive and digitize the at least one vortex sensor signal as to convert the at least one vortex sensor signal into a digital vortex sensor signal and to provide the digital vortex sensor signal at a digital output of the at least one converter circuit.

8. The measurement system of claim 1, further comprising a temperature sensor arranged downstream of the bluff body or therein and configured to generate at least one temperature sensor signal that follows a change in a temperature of the flowing fluid with a change in at least one signal parameter, wherein the transducer electronics are further configured to receive the at least one temperature sensor signal and to determine, based on the at least one temperature sensor signal, temperature measurement values representing a temperature of the fluid.

9. The measurement system of claim 8, wherein the transducer electronics are configured to generate flow parameter measurement values of a second type, including measurement values calculated using one or more temperature measurement values but without using a vortex frequency measurement value, for the at least one flow parameter.

10. The measurement system of claim 9, wherein the transducer electronics are configured to:
generate a control command prompting output of flow parameter measurement values of the second type when the second signal component is present in the at least one vortex sensor signal but the first signal component is not present or is not determined in the at least one vortex sensor signal; and/or
generate a control command preventing output of flow parameter measurement values of the second type when the first useful component is present in the at least one vortex sensor signal; and/or
output flow parameter measurement values of the second type when the second signal component is present in the at least one vortex sensor signal but the first signal component is not present or is not determined in the at least one vortex sensor signal; and/or
use an equivalence frequency calculated based on the temperature when the second signal component is present in the at least one vortex sensor signal but the first signal component is not present or is not determined in the at least one vortex sensor signal; and/or output no flow parameter measurement values of the second type when the first signal component is present in the at least one vortex sensor signal.

11. The measurement system of claim 10, wherein the equivalence frequency is a frequency corresponding to the acoustic velocity for determining measurement values for the at least one flow parameter.

12. The measurement system of claim 9, wherein the transducer electronics are configured to calculate at least the flow parameter measurement values of the second type also using an isentropic exponent, including a characteristic number representing a ratio of a heat capacity of the fluid at constant pressure to a heat capacity of the fluid at constant volume.

13. The measurement system of claim 8, wherein the transducer electronics are configured to determine, using both the at least one vortex sensor signal and the at least one temperature sensor signal, the acoustic velocity of the fluid flowing past the bluff body and to calculate acoustic velocity measurement values representing the acoustic velocity.

14. The measurement system of claim 13, wherein the transducer electronics are configured to calculate at least the flow parameter measurement values of the second type also using one or more acoustic velocity measurement values and to output the acoustic velocity measurement values as flow parameter measurement values of the second type.

15. The measurement system of claim 8, wherein the transducer electronics are configured to determine, using both the at least one vortex sensor signal and the at least one temperature sensor signal, a Mach number of the fluid flowing past the bluff body and to calculate Mach number measurement values representing the Mach number.

16. The measurement system of claim 15, wherein the transducer electronics are configured to:

to set the Mach number measurement value to a predetermined fixed value or to output the predetermined fixed value as a Mach number measurement value when the second signal component is present in the at least one vortex sensor signal but the first signal component is not present or is not determined in the at least one vortex sensor signal; and/or to calculate at least the flow parameter measurement values of the second type also using one or more Mach number measurement values.

17. The measurement system of claim 1, wherein the transducer electronics are configured to calculate the flow parameter measurement values of the first type also using a Strouhal number, including a characteristic number representing a ratio of the shedding frequency to the flow speed of the fluid flowing past the bluff body.

18. The measurement system of claim 1, further comprising a pressure sensor arranged downstream of the bluff body and configured to generate at least one pressure sensor signal that follows a change in a static pressure of the flowing fluid with a change in at least one signal parameter, wherein the transducer electronics are configured to receive the at least one pressure sensor signal and to determine, based on the at least one pressure sensor signal, pressure measurement values representing said pressure of the fluid.

19. The measurement system of claim 18, wherein the transducer electronics are configured to calculate at least the flow parameter measurement values of the second type also using one or more pressure measurement values.

20. The measurement system of claim 1, wherein the transducer electronics are configured such that when neither the first signal component nor the second signal component is determined in the at least one vortex sensor signal to generate and output a message indicating no fluid is currently flowing through the tube and/or to provide neither flow parameter measurement values of the first type nor flow parameter measurement values of the second type that are greater than zero.

21. The measurement system of claim 1, wherein the vortex sensor includes a deformation element having a first surface facing the lumen and an opposing second surface at least partially parallel to the first surface, and wherein the vortex sensor includes at least one transducer element arranged above and/or on the second surface of the deformation element, the at least one transducer configured to detect movements of the deformation element and convert them into the at least one vortex sensor signal.

22. The measurement system of claim 21, wherein the vortex sensor includes a planar or wedge-shaped sensor lug extending from the first surface of the deformation element to a distal end.

23. The measurement system of claim 1, wherein the fluid is gaseous.

24. The measurement system of claim 1, further comprising a display element coupled to the transducer electronics and adapted to output measurement values provided by the transducer electronics for the at least one flow parameter and/or messages generated via the transducer electronics.

* * * * *